(No Model.)
J. M. BAILEY.
PIPE COUPLING.
No. 324,211. Patented Aug. 11, 1885.
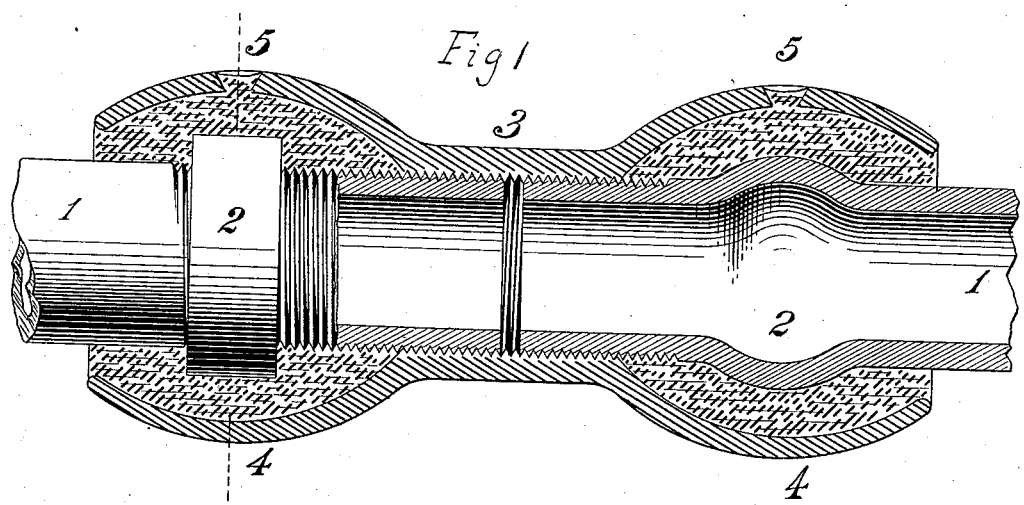
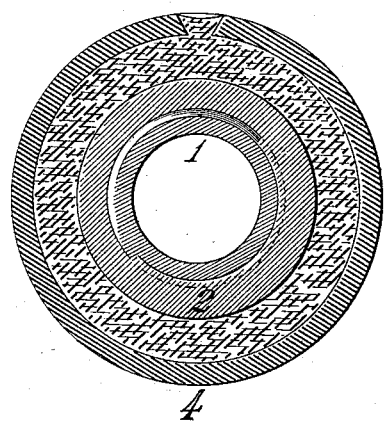
WITNESSES:
C. M. Clarke
M. S. Murphey.
INVENTOR.
James M. Bailey
BY George H. Christy
ATTORNEY.

UNITED STATES PATENT OFFICE.

JAMES M. BAILEY, OF PITTSBURG, PENNSYLVANIA.

PIPE-COUPLING.

SPECIFICATION forming part of Letters Patent No. 324,211, dated August 11, 1885.

Application filed March 13, 1885. (No model.)

*To all whom it may concern:*

Be it known that I, JAMES M. BAILEY, a citizen of the United States, residing at Pittsburg, in the county of Allegheny and State of Pennsylvania, have invented or discovered certain new and useful Improvements in Pipe-Couplings, of which improvements the following is a specification.

In the accompanying drawings, which make part of this specification, Figure 1 is a longitudinal section of a pipe-line in which my improved form of coupling is employed for uniting the sections composing such line. Fig. 2 is a transverse sectional view of the improved coupling, showing a modified form of retaining nut or shoulder.

It has been ascertained by experience that whenever the sections composing a pipe-line are broken or ruptured, such break or rupture generally occurs in close proximity to the coupling, in that part of the pipe-section which has been weakened by the cutting of screw-threads in the walls.

The object of my invention is to so construct a coupling-socket that the weakened portion of the pipe may not only be braced or strengthened as against rupture, but that in case such rupture does occur the integrity of the line may be preserved, thereby preventing the escape and loss of the fluid conducted thereby; and to these ends my invention consists in the construction and combination of parts, all as more fully hereinafter described and claimed.

The ends of the pipe-sections 1 are threaded in the usual manner and for the usual distance along the pipe, except in one form in which my invention is applied, and in that form the threads are extended a little farther along the pipe than is customary, as will be more fully hereinafter described. On the sections 1, just in the rear of the screw-threads, is formed a circumferential shoulder or collar, 2, which may be formed in a variety of ways—as, for example, by expanding a portion of the pipe in the rear of the threads, as shown at the right in Fig. 1, or by extending the threads along the pipe, as above stated, and then screwing a polygonal or circular nut on such extended threads—and hence I do not wish to confine myself to any specific form of shoulder or collar, nor to the manner of making the same.

The ends of the pipe-sections thus constructed are inserted into a coupling consisting of a cylindrical central portion, 3, internally threaded for engagement with the threaded ends of the sections, and end chambers, 4, formed integral with the central portion. The internal diameter of these chambers is considerably greater than the diameter of the pipe-sections 1 or of the shoulders or collars 2, formed thereon; but said chambers, which are of a length sufficient to extend beyond the collars, are contracted toward their outer ends, as shown, the mouths of said chambers being of a diameter only slightly in excess of the diameter of the collars 2, thus forming re-entrant angles in the chambers. After the sections have been tightly screwed into the cylindrical portion of the coupling the mouths of the chambers are closed by a dam of clay or other suitable material, and the chambers 4 are filled with molten lead or other suitable packing through the pouring-holes 5.

It will be observed that in case of the breakage of the sections 1, when united by the coupling above described, the chambers 4 and the packing will prevent any escape of the fluid, and the packing around the pipe, between the shoulder or collar 2 and the contracted mouth of the chamber will prevent the pipe from being drawn out; and it is a further characteristic of my improved coupling that the chambers and the packing therein will brace or strengthen the pipe at its weak point as against rupture.

The circumferential enlargements, shoulders, or collars hereinbefore referred to each constitute in effect an exterior enlargement of the pipe on which it is placed, in such manner and position that when in use the lead or other equivalent packing may engage the same with an effect somewhat akin to that of a hook or dovetail connection, and in that sense I use the general term of an enlargement as expressive of or embodying, broadly and generally, this feature of construction.

I claim herein as my invention—

A coupling-socket consisting of an internally-threaded central portion and end chambers having contracted mouths, in combination with pipe-sections having exteriorly-threaded ends and an enlargement in the rear of and adjacent to the threaded portions, said
5 enlargements being adapted to fit within the end chambers of the socket, substantially as set forth.

In testimony whereof I have hereunto set my hand.

JAMES M. BAILEY.

Witnesses:
 EDWARD J. DONNELLY,
 DARWIN S. WOLCOTT.